United States Patent
Andersen et al.

(10) Patent No.: US 11,676,251 B2
(45) Date of Patent: Jun. 13, 2023

(54) METHOD AND SYSTEM FOR EXTRACTING METADATA FROM AN OBSERVED SCENE

(71) Applicants: Terje N. Andersen, Trondheim (NO); Bernt Erik Røst, Trondheim (NO)

(72) Inventors: Terje N. Andersen, Trondheim (NO); Bernt Erik Røst, Trondheim (NO)

( * ) Notice: Subject to any disclaimer, the term of this patent is extended or adjusted under 35 U.S.C. 154(b) by 132 days.

(21) Appl. No.: 17/425,092

(22) PCT Filed: Feb. 3, 2020

(86) PCT No.: PCT/NO2020/050025
§ 371 (c)(1),
(2) Date: Jul. 22, 2021

(87) PCT Pub. No.: WO2020/159386
PCT Pub. Date: Aug. 6, 2020

(65) Prior Publication Data
US 2022/0108549 A1    Apr. 7, 2022

(30) Foreign Application Priority Data

Feb. 1, 2019    (NO) .................................. 20190139

(51) Int. Cl.
| | |
|---|---|
| *G06K 9/00* | (2022.01) |
| *G06V 20/40* | (2022.01) |
| *G06F 16/78* | (2019.01) |
| *G06V 10/25* | (2022.01) |
| *G06V 10/30* | (2022.01) |

(52) U.S. Cl.
CPC .......... *G06V 20/44* (2022.01); *G06F 16/7867* (2019.01); *G06V 10/25* (2022.01); *G06V 10/30* (2022.01); *G06V 20/46* (2022.01)

(58) Field of Classification Search
CPC ........ G06V 20/44; G06V 10/25; G06V 10/30; G06V 20/46; G06V 20/64; G06V 20/10; G06V 20/70; G06V 10/34; G06V 20/20; G06V 20/48; G06V 20/49; G06V 10/462; G06F 16/7867; G06T 2207/20048; G06T 5/003; G06T 5/10; G06T 7/00; G06K 9/00523

See application file for complete search history.

(56) References Cited

U.S. PATENT DOCUMENTS

| | | |
|---|---|---|
| 8,767,047 B2 | 7/2014 | Molnar et al. |
| 8,824,833 B2 | 9/2014 | Dagher et al. |

(Continued)

FOREIGN PATENT DOCUMENTS

| | | |
|---|---|---|
| WO | 2010022185 A1 | 2/2010 |
| WO | 2016114950 A1 | 7/2016 |

OTHER PUBLICATIONS

International Search Report and Written Opinion dated May 5, 2020 for International Patent Application No. PCT/NO2020/050025.

*Primary Examiner* — Dhaval V Patel
(74) *Attorney, Agent, or Firm* — Alix, Yale & Ristas, LLP (57) ABSTRACT

Method and system for extracting metadata from an observed scene comprising the use of high-speed image sensor array observing the scene through a field-of-view, filtering, matching of interesting information defined as activity/incident in the observed scene with a predefined-library, adapting the filtering to enhance frequencies of interest and suppress all others, and extracting metadata of interest.

20 Claims, 4 Drawing Sheets

(56) References Cited

U.S. PATENT DOCUMENTS

| | | | |
|---|---|---|---|
| 10,460,429 B1 | 10/2019 | Pinkus et al. | |
| 10,755,341 B2 * | 8/2020 | Rhoads | G06F 16/00 |
| 2011/0212717 A1 | 9/2011 | Rhoads et al. | |
| 2011/0274406 A1 | 11/2011 | Kashiwagi et al. | |
| 2014/0080428 A1 | 3/2014 | Rhoads et al. | |
| 2014/0177706 A1 * | 6/2014 | Fernandes | H04N 19/59 |
| | | | 375/240.03 |
| 2014/0333775 A1 * | 11/2014 | Naikal | H04N 21/44008 |
| | | | 348/159 |
| 2016/0212441 A1 * | 7/2016 | Adsumilli | H04N 1/32187 |
| 2017/0274205 A1 | 9/2017 | Chen et al. | |

* cited by examiner

METHOD AND SYSTEM FOR EXTRACTING METADATA FROM AN OBSERVED SCENE

BACKGROUND

The disclosed embodiments relate to a method for extracting metadata from an observed scene and to a system for extracting metadata from an observed scene.

The embodiments especially relate to the extraction of metadata for activities/incidents interest for a user in an observed scene and suppressing all others.

All signals in the real world are analog and time continuous. When light from the real world is captured in a digital image sensor array, the signals are converted to a digital and time-discrete representation. The analog light intensity is captured as a digital number, and the time continuous behavior of the real light is replaced by a time-discrete representation defined by the shutter timing.

Most activity in an analog video scene, will happen at a limited set of frequencies. This means that two activities happening at the same location can be separated in frequency domain, as their frequencies are different. When the scene is captured in a time-discrete sensor array, the frequency content will change for high frequencies as described in more details below.

In order to achieve controlled extraction of information from rapidly moving objects and artifacts, a combination of high-speed video capture and digital filtering can be used to enhance information of interest while suppressing distracting information.

For standard speed video processing, digital filtering is well known for a skilled person.

The use is mainly for controlling auto focus, sharpening images, reduction of noise in images, as well as detection of movement, movement vector, etc.

There is also known to use digital filtering for finding depth information in images, evaluation of pixel for pixel, as well as correction of data in an image.

It is also known to use digital filtering for determining the distance from a camera to an object. The most solutions make use of either two cameras or a camera and a light source, while others use focal length for calculating the distance to the object. The main use is for controlling the auto focus.

Drawbacks of the prior art solutions is that many of the solutions require the use of means for adding information into an observed scene, such as a light source.

Another drawback of the prior art solutions is that they are not arranged for retrieving metadata from the observed scene.

A further drawback of the prior art solutions is that they are not arranged to track an object in an image sensor sequence of the observed scene.

For high-speed video processing, effects that cannot be seen by the human eye can be utilized. E.g. a shock wave will make the air density change. This will bend the light going through the scene, and will generate high frequency signals that can be captured by a high-speed video camera. This high-speed behavior can be separated from the background scene by a high-pass digital filter. This is known today and called 'fast-frame differencing' in high-speed video processing. In this 'fast-frame differencing' mode, the previous frame is subtracted such that the output represents the difference between two consecutive frames. This makes the high-frequency pattern of the shock wave remain in the video, and makes it possible for the operator to see the perimeters of the shock wave.

In present solutions, the frequency behavior of the objects in the scene is not characterized. There is also no defined relation between the frequency behavior and the time-domain metadata.

SUMMARY

Provided herein is a method and system for extracting metadata from an observed scene partly or entirely solving the above-mentioned drawbacks and lacks of prior art.

Also provided is a method and system for extracting metadata from an observed scene for an interesting activity/incident in an observed scene from a high-speed image sensor array sequence.

Also provided is a method and system for extracting metadata from an observed scene enabling tracking of an object of interest in the observed scene.

Also provided is a method and system for extracting metadata from an observed scene capable of extracting information of interest from the observed scene and suppressing irrelevant information from the observed scene.

Also provided is a method and system for extracting metadata from an observed scene providing real-time information of interest to a user.

I Also provided is a method and system for extracting metadata from an observed considerably reducing the amount of data to be processed for extraction of data of interest for a user by removing irrelevant information to an extent that is not possible with prior art solutions.

Also provided is a method and system for extracting metadata from an observed scene that is robust and precise.

Also provided is a method and system for extracting metadata from an observed scene without adding reference information to the observed scene. Examples of such reference information can be a tracking light or radar transmit signal.

Also provided is a method and system for extracting metadata from an observed scene that has a wide area of use.

Also provided is a method and system for extracting metadata from an observed scene that is not visible to the human eye. This may be movements/vibrations at frequencies that are too high or moving distance too low for the human eye to follow.

Also provided is a method and system for extracting metadata form an observed scene where extracted information in the frequency domain may be used in time-domain object analysis.

The present invention is related to a method and system for extracting metadata from an observed scene by the use of a high-speed sensor array and frequency filtering.

The disclosed embodiments are related to a passive method and system, i.e. there is no information added to the observed scene.

While prior art solutions operate in the time-domain, the disclosed embodiments operate in the frequency domain, which will be elaborated below.

Figure 1:
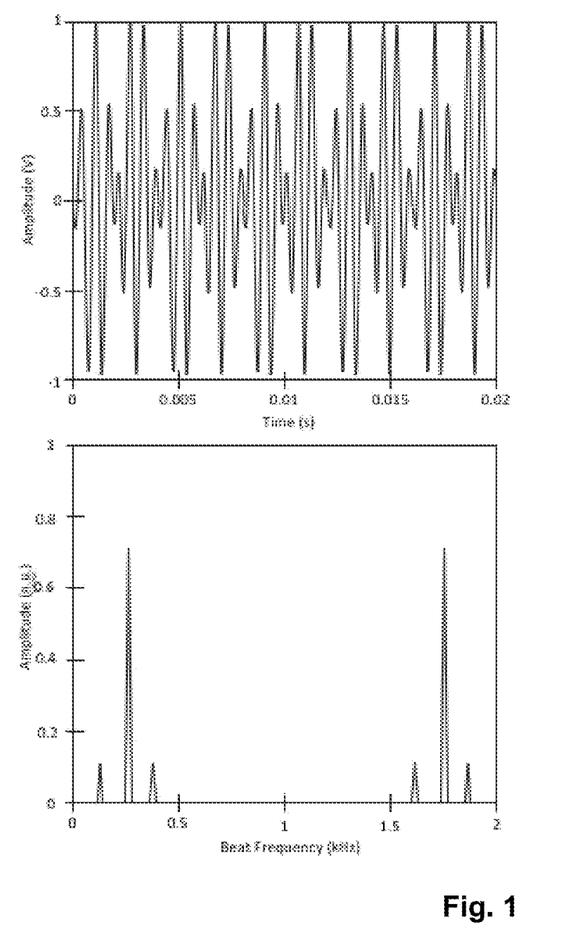
FIG. 1 is a principle drawing of frequency signals.

Any repeated signal in time-domain can be represented by a limited set of frequencies. A pure sinusoidal wave can be represented in frequency-domain with one single frequency with a magnitude and phase. A more complex repeated beat signal can be represented with a set of frequencies as shown in FIG. 1.

The disclosed embodiments are based on the use of frequency filtering. In a high-speed image sensor array sequence, which also can be considered as a sensor array data stream such as but not limited to a high-speed video sequence, many of the activities/incidents in the observed scene will follow a pattern where movements are limited to a limited set for frequencies, or operate within a limited frequency band.

If the activities/incidents, such as movement of an object, of interest operate at frequencies that are separated from activities/incidents that are considered irrelevant, information about the activity/incident of interest can be extracted through appropriate filtering.

This can be achieved by e.g. arranging filter passband at frequencies where detected activity/incident, e.g. movement, of interest occur and/or arranging filter stop-band where irrelevant activity/incident, e.g. movement occur.

As an example; if a car passes through an observed scene at a rainy day, the disclosed embodiments may be arranged to detect the frequency of the moving car, and arrange filter passband at this frequency. By suppressing all other frequencies, the quality of detected information about the car will be improved.

Accordingly, the following parameters are defined herein for a high-speed image sensor array sequence (sensor array data stream or video sequence):

Frame Rate (Fr)=1/Tr where Tr is the time between two consecutive frames in the high-speed image sensor array sequence.

Maximum activity frequency of interest will be given by $Fact_{max}$. This is the highest frequency where activity of interest is present in the observed scene.

Absolute maximum activity frequency will be given by $FabS_{max}$. This is the highest frequency where there is any activity in the observed scene.

This means that the time unit in the high-speed image sensor array sequence (sensor array data stream or video) is set by the Frame rate, and Frame Rate will digitally be represented by the unit frequency 1.

To guarantee that a frequency in the observed scene is represented by the same frequency in the high-speed image sensor array sequence, the Nyquist criteria must be fulfilled so that:

$$Fact_{mcK}<=Fr/2=F_{nyq} \quad \text{(Equation 1)}$$

If $Fact_{max}>Fr/2$ the frequency will be folded down to: $F_{out}=Fr-Fact_{max}$. If this is not fulfilled, this will result in that, if you capture a high-speed image sensor array sequence (sensor array data stream or video sequence) of e.g. a starting wheel, at a certain speed it will start to look like the wheel spins backwards. This is because the frequency of the wheel is folded to a lower frequency. This effect is known as the wagon-wheel effect and is well known for skilled person and is e.g. described in https://en.wikipedja.org/wjkl/Vyagon-wheel effect.

Accordingly, to be able to utilize the frequency filtering technique, the Nyquist criteria must be fulfilled for the activity/incident of interest in the observed scene.

To ensure that irrelevant information not folds into frequency of interest the following must be fulfilled:

$$FabS_{mcx}+Fact_{mcx}<Fr \quad \text{(Equation 2)}$$

When Fr fulfills both equation 1 and equation 2, the Nyquist criteria is fulfilled for the first Nyquist zone. Below this is referred to as the Nyquist criteria. Fulfilling the Nyquist criteria for Nyquist zone other than the first is described below.

If this is not fulfilled, irrelevant activity at a high frequency may fold during capture and disturb activity of interest in the captured sensor array data stream or video scene.

In the disclosed embodiments, which are based on the use of a high-speed image sensor array, the Fr can be kept high.

This means that the physical frequencies where the Nyquist criteria are fulfilled can be high, so that the frequencies can be preserved for fast moving objects.

Figure 2:
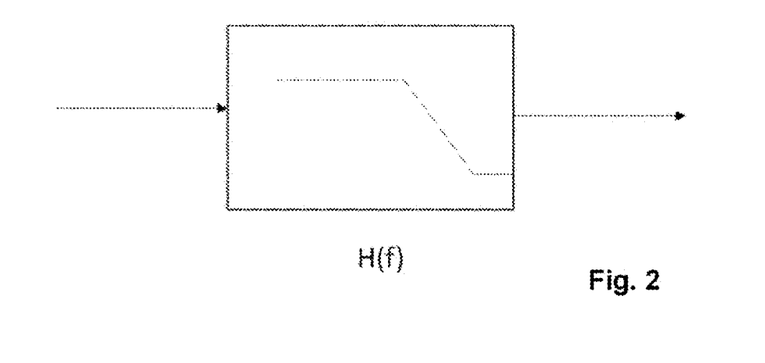
FIG. 2 is a principle drawing of an anti-aliasing filter.

According to a further embodiment, an anti-Aliasing filter may be used to ensure that the frequencies of interest are guaranteed Aliasing, or folding-free. An example of such a filter is shown in FIG. 2.

Further, a sensor array data stream or video sequence is directly sampled to the high-speed image sensor array frame (sensor array data stream or video frame) with a sampling clock that defines the Frame Rate.

This means that analogue anti-Aliasing filters from sensor or RF electronics does not apply to high speed image sensor array filtering.

However, as long as the Frame Rate is kept so high that the Nyquist criteria is fulfilled for at least most of the observed scene, filtering techniques can be applied to extract information of interest.

This will be valid for very high-speed image sensor array, such as high-speed cameras (i.e. cameras capable of capturing moving images with exposures of less than $\frac{1}{1000}$ second or frame rates in excess of 250 frames per second), and for observed scenes with only very slow-moving objects.

In both cases the Nyquist criteria can be fulfilled as long as Fr is selected to fulfill the equations as described above. In order to secure that the Nyquist criteria is fulfilled, information about $F_{max}$ for the detected object/activity/incident must be available as part of the solution.

Figure 3:
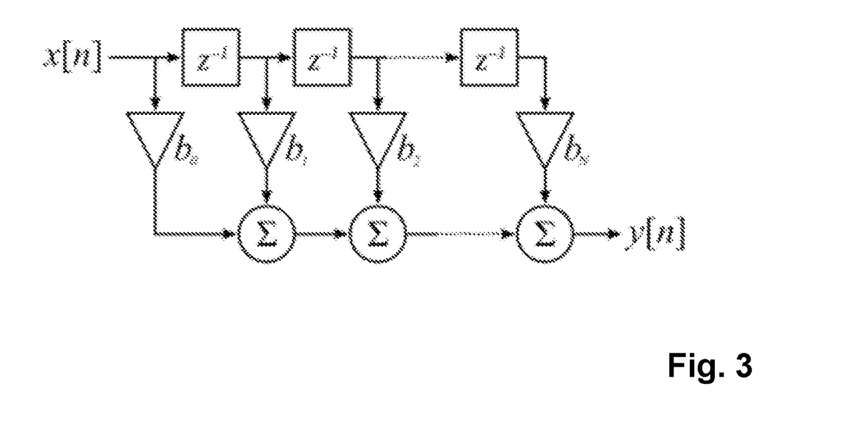
FIG. 3 is a principle drawing of a Z-domain FIR filter.

Filtering is performed in the frequency domain, and makes use of high-speed image sensor array filters in the form of digital Z-domain data filters, also known as Z-domain finite impulse response (FIR) filters, which is known for a skilled person and described e.g. on https://en.wjkjpedja.org/wikj/Rnite impulse response, and in FIG. 3 is shown a block diagram of a direct form discrete-time FIR filter of order N. The top part is an N-stage delay line with N+1 taps. Each unit delay is a $Z^1$ operator in Z-transform notation.

Image sequence filtering has prior been used for enhancing a desired activity/incident/object by delaying one or two image frames and subtracting. That is equivalent to a $1^{st}$ order digital high pass FIR filter, with either bi or b2 set to −1 and all other taps set to 0.

The resulting image sequence (sensor array data stream or video) shows only the fastest moving objects, such as the flame and the shockwave from a firing cannon or firearm.

The inventive method and system are based on observing a scene with a high-speed image sensor array and using at least one higher (>=2) order digital Z-domain data filter for ensuring that the Nyquist criteria is fulfilled for all activities/incidents of interest in the observed scene.

The method and system are further based on a pre-defined library of frequencies of activities/incidents of interest. The pre-defined library is used to match interesting information defined as activity/incident in an observed scene (high-speed sensor array sequence) with the pre-defined library of frequencies of activities/incidents, whereupon metadata of interest to the user can be extracted from the collected high-speed sensor array data.

Accordingly, the method and system are based on collecting high-speed image sensor array data such that the Nyquist criteria is fulfilled for all activities/incidents to be tracked. By that the Nyquist criteria is fulfilled a frequency pattern, such as movement of an object, can be matched with the pre-defined library.

The metadata is extracted by adapting coefficients of the digital Z-domain data filter to enhance the frequencies of interest and suppress all others to magnify the ratio between the frequency signal of interest and noise.

The method and system can further comprise, after the mentioned first filtering, the use of Decimation filter techniques to reduce activity rate while preserving a unique frequency content for a more efficient processing of the sensor data.

Decimation filtering can be a tool to provide 'controlled aliasing' also called undersampling. By controlled aliasing is meant that in cases where $F_{max}$ is higher than the Nyquist criteria, the frequency information is still unique given that:

$$Fmax - Fmin < Fr/2 \quad \text{(Equation 3)}$$

In this case, all information will be folded with the same factor, and the frequencies will not mix. This is utilized in Decimation filters, and can be utilized to reduce data-rate for activities at a high but narrow frequency band.

The disclosed method and system may use correlated information to detect activity/incident of interest. In practice, all sensors capable of detecting a frequency may be used. E.g. parallel image sensors operating at different sampling rates may be used to provide correlated information. Other examples of sensors that may provide correlated information is audio sensors or microphone arrays. Yet another example of sensors that may provide correlated information is electromagnetic sensor, antenna arrays or similar.

A microphone array can be utilized to detect existence of, and angle to a sound of interest. This information can be correlated to high-speed visual information from the present invention to improve efficiency of object detection and characterization.

The disclosed embodiments considerably reduce the amount of information/data that needs to be processed, as one rapidly can detect the relevant frequency for the activity/incident of interest and relate the further processing to the relevant frequency.

By operating in the frequency-domain instead of the time-domain it is achieved a true extraction of relevant information for the user. It is further achieved a more robust and extensive extraction of relevant information.

By operation in frequency domain, activity that is repeated in time-domain will, as described, generate a limited set of frequencies. This will give a more efficient extraction of data in Frequency domain compared to time-domain analysis.

The method and system also allow extracting metadata from an observed scene with a wide area of use, and which can in a simple manner be tailored to the relevant area of use.

An implementation of the above described method and system may be achieved with a high-speed image sensor array comprising at least two image sensors and a control unit. The high-speed image sensor array will observe a scene through a field-of-view and the image sensors of the high-speed sensor array will read information (image sensor data from a sensor sequence) from the observed scene. Accordingly, there is only a passive observation of the scene, as there is not added any information to the observed scene. The high-speed image sensor array will typically observe the scene through at least one optical lens.

The output of the high-speed image sensor array is supplied to the control unit which is provided with means and/or software for processing the collected information/data from the high-speed image sensor array. The means and/or software for processing the collected information comprises at least one higher (>=2) order digital Z-domain data filter ensuring that the Nyquist criteria is achieved for all activities/incidents (frequencies) to be tracked.

This provides a unique basis for using frequency information in a high-speed image sensor sequence for further separation of high-speed image sensor data that are considered irrelevant, i.e. extracting metadata of the information one is interested in. This is a completely different approach than prior art, where the focus is to provide improved images/videos, i.e. sharpening the total image.

The control unit will further be provided with a database containing a pre-defined library of frequencies of activities/incidents of interest. Based on the digital Z-domain filter one can match frequencies of interest with the frequencies of the pre-defined library.

Based on the match of frequencies one can adapt coefficients of the digital Z-domain filter to enhance the frequencies of interest and suppress all others to magnify the ratio between the frequency of interest and noise.

Hence, one may identify unique frequencies or correlation with other signals in the data from the observed scene. One will be able to retrieve information which is not possible with other techniques. One will further be able to remove far more of the noise positioned at uninteresting frequencies, and thus eliminate effects from noise as rain, snow, wind, etc.

With access to the extracted high frequency information, the extracted object or object movement may be further processed in time-domain.

The extraction method also applies to the effects caused by a high-speed moving object. An example can be the airwaves and/or turbulence around a fast-moving object, which will bend the light passing through the impacted air. The profile of the air turbulence can be extracted in frequency domain, and post-processed in time-domain to generate metadata related to the object causing the bending of the light.

The principles of the method and system are also applicable for other sensors capable of detecting movements/frequencies.

BRIEF DESCRIPTION OF THE DRAWINGS

The present invention will below be described in further detail with references to the attached drawings, where.

DETAILED DESCRIPTION

Figure 4:
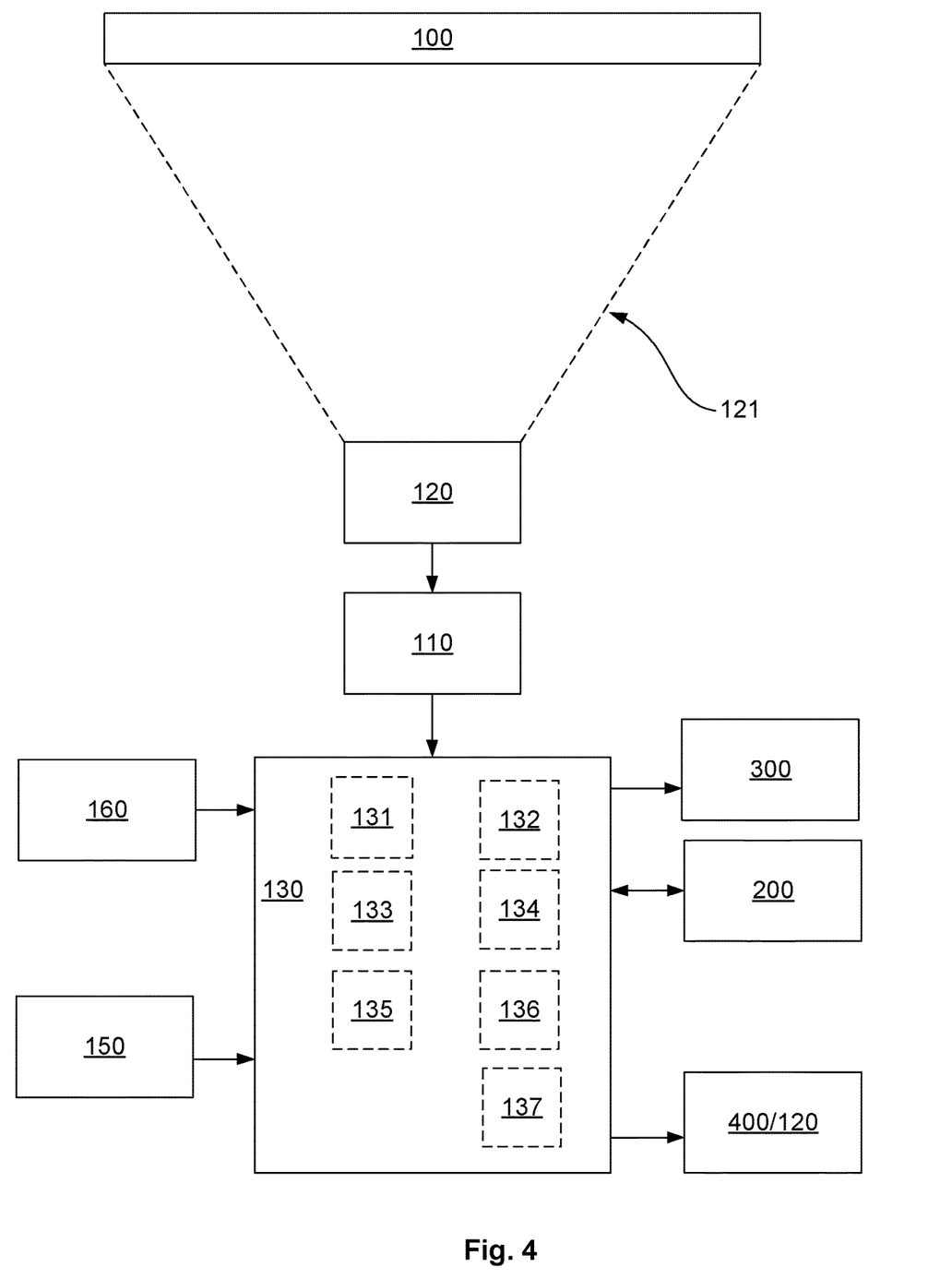
FIG. 4 is a block diagram representation of the disclosed method and system.

Reference is first made to FIG. 4 which is principle drawing of one embodiment of a system. The system comprises at least one high-speed image sensor array (HSISA) 110 comprising at least two image sensors observing a scene 100 through a field-of-view 121. In the shown embodiment the system further comprises at least one optical receiver lens 120 observing the scene 100 through the field-of-view 121 and focusing the observed scene 100 onto the HSISA 110. The output of the HSISA 110 is supplied to a control unit 130 provided with means and/or software for processing the collected information/data from the HSISA 120.

The means and/or software for processing the collected information/sensor sequence comprises at least one higher (>=2) order digital Z-domain data filter 131 for ensuring that the Nyquist criteria is fulfilled for all activities/incidents of interest.

The control unit 130 is further provided with a database 132 containing a pre-defined library of frequencies of activities/incidents, such as movements, of interest. Accordingly, the control unit 130 is provided with means and/or software 133 for matching interesting information defined as an activity/incident in the observed scene 100 with the pre-defined library of frequencies.

The control unit is further provided with means and/or software 134 for extraction of metadata of interest to the user from the HSISA 110 data sequence, by that the means and/or software 134 is arranged to adapt coefficients of the Digital Z-domain data filter 131 to enhance the frequencies of interest and suppress all others to magnify the ratio between the frequency signal of interest and noise.

According to a further embodiment, the control unit 130 can further be provided with means and/or software 135, such as at least one decimation filter, for reducing activity rate while preserving a unique frequency content. In several cases this methodology will significantly reduce the required amount of data processing to extract metadata. Post processing filters, such as decimation filters will be object dependent. This means that parallel filters may be utilized to extract metadata for multiple objects in the same observed scene.

Figure 5:
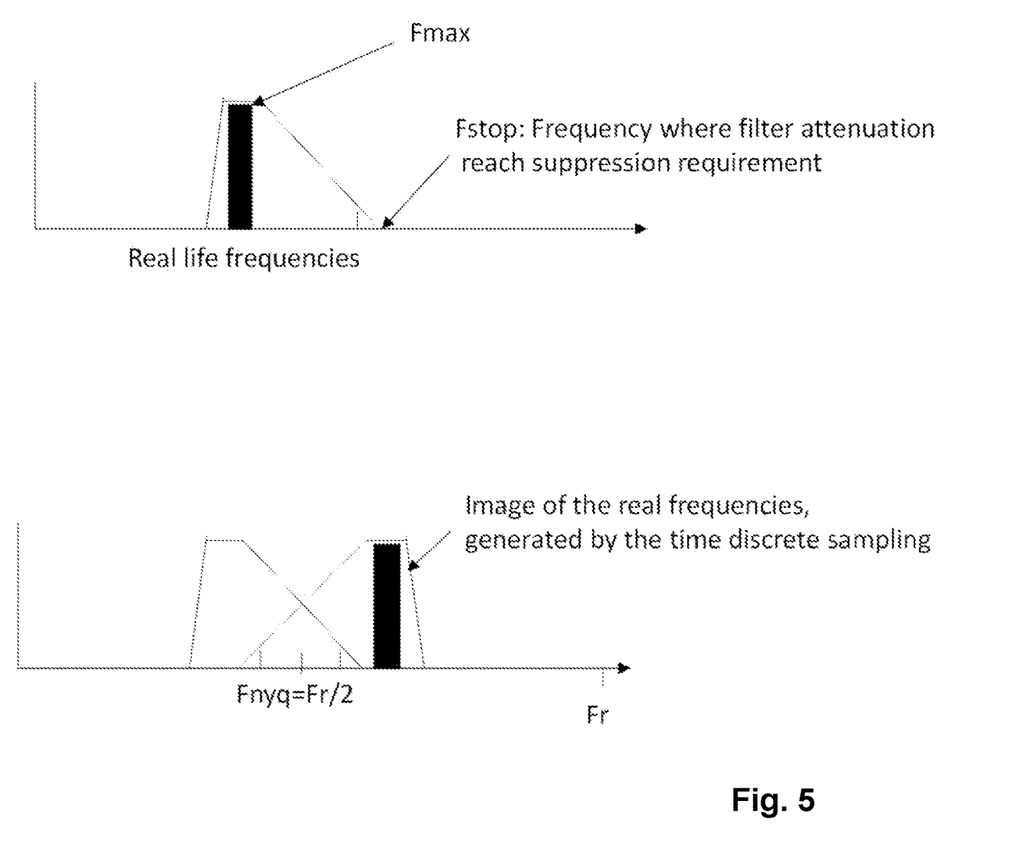
FIG. 5 is a principle drawing of definition of anti-aliasing frequencies.

Reference is now made to FIG. 5 which is a principle drawing of definition of anti-aliasing frequencies. In digital domain, all frequencies are repeated, as shown in FIG. 5. $F_{stop}$ is the frequency where the filter attenuation reach suppression requirements.

As can be seen: As long as $F_{stop}+F_{max}<Fr$, the Frequency contents up to $F_{max}$ is preserved.

Figure 6:
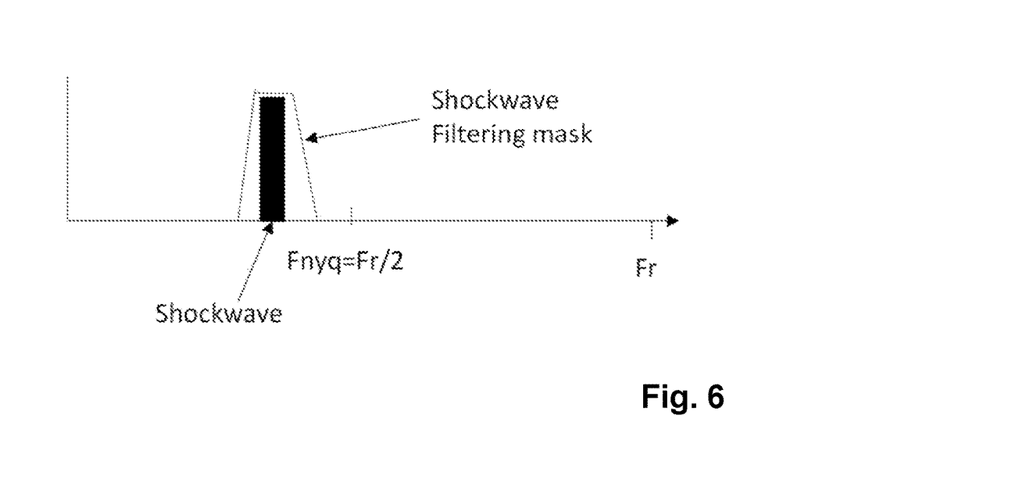
FIG. 6 is an example of detection of a hunting rifle bullet shockwave.

Reference is now made to FIG. 6, where an example of a hunting rifle bullet shockwave is described.

The bullet with its shockwave will move with a pattern that can be recognized. The shockwave will contain repeated time patterns, and hence be identified in a limited set of frequencies.

The shockwave is captured at high frame-rate to ensure no aliasing as shown in FIG. 6.

The digital Z-domain data filter 131 ensures that the frequencies and the scene area where the shockwave is present is enhanced, while all other information suppressed. The filtering by the digital Z-domain data filter 131 will enhance the signal-to-noise-ratio and ensure visibility of the shockwave also when it was not possible to detect in original scene.

The filter parameters of the digital Z-domain data filter 131 are adaptive, and the filtering mask moved and the scene changes. The changes in filter coefficients/parameters of the Z-domain filter 131 are predefined based on machine learning on similar scenes or changing based on one or more predefined predictive functions.

The disclosed method and system are based on finding a match between a detected activity in the sensor array data stream or video scene and a pre-defined set of objects and object activities in a library. The object library, with a metadata set related to the object will be made available for processing of the observed scene. Once an incident is detected that may match one of the items in the library is identified, the metadata is extracted and compared to the selected library item. When a match is detected, the stored library information is utilized to improve tracking efficiency, identification accuracy and to predict behavior.

Information from new sensor array data streams or video scenes will be used as machine learning, by updating the object/incident library with information from the captured sensor array data streams or video scenes.

Reference is again made to FIG. 4. According to a further embodiment, the system comprises input means 150 in the form of one or more additional sensors or sensor arrays for enhanced detection of activity of interest. In order to identify sequences of interest, correlated information from the mentioned input means 150 may be used. Examples of additional sensors, but not limited to, are:
  parallel image sensors operating at different frame rates,
  audio sensors or microphone arrays,
  electromagnetic sensors,
  antenna arrays,
  etc.

The system may further be provided with additional input means 160, such as a global positioning system, providing location information that can be added to the data recorded and/or extracted.

According to a further embodiment the control unit 130 is further provided with a display API (application programming interface) 136 for communication with a display 200 for display of interesting information for a user of the system. The display API can further be provided with means and/or software for displaying:
  the sensor array data stream or video sequence in real time or in replay,
  only the extracted information of interest for the user,
  behavior predictions,
  a combination of these.

The display 200 will typically be a touch screen and the display API can further be provided with means and/or software for providing settings to the control unit 130.

The system may further be provided with an external data storage device 300 for storage of recorded data, extracted data, displayed data and/or additional data from input means 150, 160.

According to a further embodiment the control unit 130 is further provided with an API (application programming interface) 137 for communication with an external unit 400 and/or the at least one optical lens 120 for automatic control of this.

Some non-limiting examples of utilizations of the inventive embodiments will be described below.

The shock-wave of a hunting-rifle bullet can be tracked. This eliminates the need for a Schlieren setup that is required with prior art. With traction of the bullet-shock-wave the impact on the target animal can be detected, and metadata can include information if the bullet impact is fatal or not.

The characteristic frequencies of distractions, such as rain, snow, moving leaves on a tree or any passing objects, can be identified and removed with digital filtering. Again, in the hunting rifle example, this gives a free line-of-sight where not possible with prior art. This further enables passive/auto identification of an object, i.e. target or non-target, in an observed scene.

Further, by post-processing of the metadata information extracted in frequency-domain for time-domain object analysis, i.e. an object and/or movement of an object can be performed. By this one can e.g. measure the velocity of a moving object, such as a bullet or calculating wind.

Bending of light through any air wave-form can be characterized and provide metadata, such as:

Amount of gas emitted from a source,

Characterization of sounds through visual implications of the sound,

Vibrations from rotating objects such as motors or wheels.

By using Infra-Red information, objects can be identified without access to visual light.

The method and system may be enhanced through different modifications, which will be described below.

The high-speed image sensor array 110 may be arranged movable in relation to the field-of-view 121 with a known movement. By applying a known movement to the high-speed image sensor array 110, there will be a known movement of the observed scene (sensor array data stream or video scene) vs the high-speed image sensor array 110. This movement can be utilized for several purposes:

The movement of the high-speed image sensor array may be utilized to manipulate the characteristics frequency of an object when referred to the high-speed image sensor array. This may allow frequency separation in cases when this is not possible with a fixed array.

Movement of the high-speed image sensor array will move the high-speed image sensor array pixel-grid vs the observed scene (sensor array data stream or video scene). This can be utilized to enhance the resolution of the sensor array data stream or video when combined with decimation filtering.

Movement of the high-speed image sensor array generates a known displacement. This can be utilized in triangulation algorithms for distance calculations, such as for calculating distance/range to an object that is not moving.

According to a further embodiment it is arranged for utilization of modulation effects between high frequency movement of the at least one lens or the high-speed image array and high frequency sensor array data stream or video frames to increase resolution.

When a scene is exposed to an image array with low resolution, the light that is captured in one pixel will be an average of the scene that is exposed to that specific pixel. If the scene is still, there will be no change for that pixel from frame to frame. By moving the image array or a lens with a small movement in the order of the size of a one or a few pixels, the information captured in one pixel will change. The change in information from frame to frame can be correlated by the known movement of the lens or image array to define a sub-grid finer than the original pixel grid. Hence, a sensor array data stream or video sequence with lower frame-rate but higher resolution compared to the original sequence can be extracted.

With the present innovation night vision capabilities can be enhanced through:

Tracking of high-speed objects ensures that the reflected light form the object is focused. This increases the amount of light captured from the specific object over the scene, and hence increased visual information under low light night conditions Correlation of low light night vision information with high-speed thermal information may be utilized to further increase information from the object of interest Efficient digital filtering of background scene as described above reduced background noise, and ensure a defined contrast between object of interest and background.

Other examples of utilization are:

Hunting rifle sight systems with the following features:
  Passive range finding
  Passive tracking of target
  Auto identify target or non-target based on library data in sight system (e.g. deer partially visible through brush)
  Auto update object database in sight system based on machine learning
  Measure bullet speed
  Superimpose bullet path on display
  Tracking impact of bullet
  Autocorrecting sight reticle based on based on previous shot
  Calculating wind
  Recording shots
  Night vision capabilities
  See trough fog/rain
  T rack approaching objects for safety
  Track and identify multiple targets or non-targets and object at the same time
  Etc.

Drone camera systems with the following features:
  Track high speed objects of interest
  Auto update object database in sight system based on machine learning
  Calculating wind
  Night vision capabilities
  See trough fog/rain
  T rack approaching objects for safety
  Track and identify multiple targets or non-targets and object at the same time
  Etc.

Surveillance systems with the following features:
  Track and store high speed objects and movements of interest
  Auto update object database in sight system based on machine learning
  Night vision capabilities
  See trough fog/rain
  Track and identify multiple targets or non-targets and object at the same time
  Utilize interpolation between high-speed frames to freeze, enhance and store a detailed picture of a rapidly moving object of interest
  Etc.

Arena tracking with the following features:
  Utilize interpolation between high-speed frames to freeze, enhance and store a detailed picture of a rapidly moving object of interest
  Track high speed objects of interest, such as a ball or a puck
  See through fog/rain
  Etc.

Speed trap with the following features:
  Measuring velocity of approaching or leaving vehicle, hereunder also motorcycles
  Utilize interpolation between high-speed frames to freeze, enhance and store a detailed picture, such as driver or number plate
  See through fog/rain
  Night vision capabilities
  Etc.

Pollution warning with the following features:
  Track the rapid changes in light caused by the polluting gas
  Etc.

Fish tracking/measuring with the following features:
  Track a larger number of fishes by following high-speed patterns from the fish movements Correlate audio through the water with the high-speed visual information Utilize interpolation between high-speed frames to freeze, enhance and store a detailed picture of a fish for post processing Etc.

Air surveillance with the following features:

Passively scan area for interesting objects based on sensors arrays and display these to the pilot in real-time Find pinpoint and identify source of; radars, cell phones, electronic equipment emitting signals, noise, e.g. gun fire, voices etc.

Etc.

Missile tracking with the following features:

Passive tracking of target. The missile gets object information before launch and/or scans and find object autonomously and auto corrects it path on its way to target Etc.

Vibration tracking with the following features:

Track the high-speed changes from a vibrating object such as a car hood

Track the vibrations in the air around a vibration object

Etc.

Car collision avoidance with the following features:

Track for animals in front of vehicle based on object library

Track high-speed objects that may cause a collision, such as the high-speed rotating movement of a car wheel Etc.

Logistics tracking

Tracking containers and measuring e.g. weight of these compared to freight documents Etc.

Cooperation

Relay object information across multiple sights/systems

Relay object information across different types of systems with different sensor arrays Etc.

Machining/Automation/Production

Measure and provide real-time information for control unit of machinery based on sensor input CNC/Lathe machines monitor progress, tool wear, tolerances within the machine in real-time and provide controller unit data to correct Etc.

Scanning for human presence e.g. in snow avalanche

Use correlation between temperature camera and standard camera

Use digital filtering to remove all irrelevant information

Use slow tracking of objects to find human temperature profile

Use machine learning to improve algorithm to detect human temperature behavior

Etc.

These are only a few of the many possible utilizations which the method and system are applicable for and is not to be considered as limiting examples.

The above-described embodiments may be combined to form modified embodiments within the scope of the claims.

Modifications

The high-speed image sensor array may be a distributed image sensor array. By utilizing sensors that are distributed vs the sensor array data stream or video scene, the extracted information can be combined to gain depth information. The distributed sensors may be slave-sensors to a single master, or equivalent sensors in distributed array.

The at least one optical lens in front of the high-speed image sensor array may be modified for rapid movement of the at least one lens to manipulate the focal points. The at least one lens may be optimized to enhance objects/incidents of interest.

The system may further be provided with additional sensor for measuring one or more environmental variables, such as but not limited to temperature, barometric pressure, altitude, that may be provided as information for a user. This information can be utilized during mathematical modelling of the objects of interest, and used to improve accuracy of behavior predictions.

The invention claimed is:

1. A method for extracting metadata from an observed scene (100), comprising:

observing the scene (100) with a high-speed image sensor array (110) through a field-of-view (121) and using at least one higher (>=2) order digital Z-domain data filter (131) ensuring that Nyquist criteria is fulfilled for all activities or incidents of interest, matching the activities or incidents of interest in the observed scene (100) with a pre-defined library of frequencies of activities or incidents of interest, and adapting coefficients of the digital Z-domain data filter (131) to enhance frequencies of interest and suppress all other frequencies to thereby magnify the ratio between the frequency signal of interest and noise, and extracting metadata of interest to the user.

2. The method according to claim 1, comprising using a decimation filter (135) to reduce activity rate while preserving a unique frequency content.

3. The method according to claim 1, comprising using correlated information to detect one or more of the activities or incidents of interest.

4. The method according to claim 3, comprising using information extracted in frequency-domain for time-domain object analysis.

5. The method according to claim 1, comprising using information extracted in frequency-domain for time-domain object analysis.

6. The method according to claim 4, comprising calculating metadata in time-domain for one or more of object and movement of object.

7. The method according to claim 6, comprising predicting movements of objects of interest.

8. The method according to claim 1, comprising applying a known movement to the high-speed image sensor array.

9. The method according to claim 1, wherein comprising displaying one or more of (i) a sensor array data stream or video sequence in real time or in replay, (ii) only the extracted information of interest for the user, and (iii) behavior predictions.

10. The method according to claim 1, wherein extracted information is utilized to control at least one optical lens (120) to thereby control the field-of-view (121).

11. A system for extracting metadata from an observed scene (100), wherein the system comprises a high-speed image sensor array (110) observing the scene (100) through a field-of-view (121), the system comprising a control unit (130) provided with:

at least one higher (>=2) order digital Z-domain data filter (131) ensuring that Nyquist criteria is fulfilled for all activities or incidents of interest, a database (132) containing a pre-defined library of frequencies of activities or incidents of interest, means or software (133) for matching activities or incidents of interest in the observed scene (100) with the pre-defined library of frequencies, means or software (134) for adapting coefficients of the digital Z-domain filter (131) to enhance the frequencies of interest and suppress all other frequencies to thereby magnify the ratio between the frequency signal of interest and noise.

12. The system according to claim 11, wherein the control unit (130) comprises at least one decimation filter (135) for reducing activity rate while preserving a unique frequency content.

13. The system according to claim 11, further comprising an input unit (150) providing correlated information for enhanced detection of activities or incidents of interest.

14. The system according to claim 11, wherein the control unit (130) is further provided with a display application programming interface (136) for communication with a display (200) for displaying information for a user.

15. The system according to claim 11, wherein the field-of-view (121) is provided by at least one optical lens (120).

16. The system according to claim 11, wherein the control unit (130) is configured for utilizing information extracted in frequency domain for time-domain object analysis by calculating metadata in time-domain for one or more of object or movement of object.

17. The system according to claim 11, wherein the control unit (130) is configured for predicting movements of objects of interest.

18. The system according to claim 11, wherein the high-speed image sensor array (110) is arranged movable in relation to the field-of-view (121) with a known movement.

19. The system according to claim 15, wherein the at least one optical lens (120) is controllable and the control device (130) is arranged to control the at least one optical lens (120) based on extracted information.

20. The system according to claim 11, wherein the display application programming interface (136) is provided with means or software for displaying one or more of (i) a sensor array data stream or video sequence in real time or in replay, (ii) only the extracted information of interest for the user, and (iii) behavior predictions.

* * * * *